United States Patent [19]

Lowell

[11] Patent Number: 5,209,762
[45] Date of Patent: May 11, 1993

[54] METHOD AND SYSTEM FOR CONTROLLING EMISSIONS FROM GLYCOL DEHYDRATORS

[75] Inventor: Philip S. Lowell, Austin, Tex.

[73] Assignee: Gas Research Institute, Chicago, Ill.

[21] Appl. No.: 825,540

[22] Filed: Jan. 24, 1992

[51] Int. Cl.$^5$ ............................................. B01D 53/14
[52] U.S. Cl. ........................................... 55/31; 55/32; 55/41; 55/48; 55/49; 55/51; 55/189; 55/198; 55/208
[58] Field of Search .................. 55/31, 32, 40, 41, 48, 55/49, 51, 54, 189, 196, 198, 208

[56] References Cited

U.S. PATENT DOCUMENTS

| | | |
|---|---|---|
| 1,818,158 | 8/1931 | Pier et al. |
| 2,945,073 | 7/1960 | Barnes et al. |
| 3,182,434 | 5/1965 | Fryar ............................... 55/32 |
| 3,213,593 | 10/1965 | Hendrix ............................ 55/32 |
| 3,471,370 | 10/1969 | Jubin, Jr. ........................ 203/49 |
| 3,589,104 | 6/1971 | Panzarella ........................ 55/32 |
| 3,616,598 | 11/1971 | Foral, Jr. ......................... 55/32 |
| 3,736,725 | 6/1973 | Alleman et al. ................... 55/32 |
| 3,766,714 | 10/1973 | Cunningham et al. ............. 55/48 |
| 3,837,143 | 9/1974 | Sutherland et al. ............... 55/32 |
| 3,844,736 | 10/1974 | Kruis et al. ...................... 55/32 |
| 3,918,934 | 11/1975 | Kriebel et al. .................... 55/48 |
| 4,009,083 | 2/1977 | Lyon et al. ..................... 203/49 |
| 4,070,231 | 1/1978 | Alleman ....................... 55/32 X |
| 4,182,659 | 1/1980 | Anwer et al. ................... 203/18 |
| 4,193,377 | 3/1980 | Wasala et al. .................... 55/49 |
| 4,314,891 | 2/1982 | Knobel .......................... 203/18 |
| 4,670,027 | 6/1987 | Becker et al. ................... 55/48 |
| 4,689,053 | 8/1987 | Heath .......................... 55/196 X |
| 4,708,721 | 11/1987 | Ehrler ......................... 55/48 X |
| 4,976,935 | 12/1990 | Lynn ........................... 55/48 X |
| 5,084,074 | 1/1992 | Beer et al. .................... 55/32 X |

Primary Examiner—Robert Spitzer
Attorney, Agent, or Firm—Klauber & Jackson

[57] ABSTRACT

Method and apparatus are disclosed which are improvements in the conventional method and apparatus for extracting water from a produced natural gas stream by contacting the stream with a glycol to absorb the water, and then regenerating the glycol for further use in extraction by heating the moist glycol in a glycol regenerator to vaporize the water contained in same as steam. The improvement enables control of emissions of volatile organic compounds which have been absorbed by the glycol during contact with the natural gas stream, while minimizing the contaminants in the water streams produced. The vented steam and gaseous volatile organics are flowed from the glycol regenerator as input to the bottom of a steam stripper column. The vapors from the top of the steam stripper column are flowed to a cooling condenser to produce a condenser water stream having a relatively high content of the organic compounds. The condenser water stream is passed to the top of the steam stripper and then through the stripper in counter-current relation to the vented gases and steam, whereby the condenser water stream is stripped of substantial parts of its organics content and emerges from the bottom of the stripper column as a stripped water stream having low content of the organics. Optional steps for further reducing the organic content of the water produced are air stripped, steam stripping, and contacting with activated carbon.

25 Claims, 3 Drawing Sheets

METHOD AND SYSTEM FOR CONTROLLING EMISSIONS FROM GLYCOL DEHYDRATORS

RELATED DISCLOSURE DOCUMENT

This invention has been the subject of a related Disclosure Document filed at the U.S. Pat. and Trademark Office on Aug. 19, 1991 under Disclosure Document No. 289457. The said Disclosure Document is hereby incorporated by reference.

BACKGROUND OF THE INVENTION

This invention relates generally to methods and apparatus for drying gases, especially natural gas, with a glycol; and more specifically relates to a method and apparatus of this type wherein the emissions of undesired organics which normally occurs during regeneration of the glycol is minimized.

Glycol dehydrators are commonly used to extract water from produced natural gas streams to prevent problems associated with hydrate and ice formation and corrosion in the gas pipeline. Aromatic hydrocarbons are highly soluble in the triethylene glycol used in such glycol dehydrators and in the ethylene glycol used in large low temperature separation units. Therefore as the lean glycol solutions are contacted with the natural gas stream in an absorber, not only water, but various hydrocarbon species are absorbed. The water must be removed from the glycol to enable the latter's reuse in the drying of the gas. Accordingly, the water-containing (moist) glycol is conventionally heated in a so-called glycol regenerator, whereat the greater part of the water is vaporized, commonly in the form of steam and separated. A concentrated glycol having a low water content is recovered and recycled for further gas drying. This conventional type of operation is discussed in prior art patents such as U.S. Pat. Nos. 4,182,659 and 4,314,891, and is illustrated in simplified schematic fashion in the prior art system shown in FIG. 1. As seen therein the wet gas, as for example a natural gas 10 is provided to the bottom of an absorption column 12, emerges at the top of same and after passing through heat exchanger 13 is provided as a dry gas 14 for further use. During passage through the absorber 12, the gas contacts glycol 16, which is preferably triethylene glycol, in a countercurrent manner. The moist glycol emerges from the column at 18, passes through a throttle valve 20, is passed through a heat exchange loop 21 at the top of glycol regenerator 28, and provided to a flash tank 22 where it is expanded to the range of 2 to 10 atmospheres absolute. A two phase mixture forms at flash tank 22. Most of the mass will be present in the liquid phase as glycol and water. The bulk of the volume will be in the gas phase, mostly as light gases such as methane and propane. These light gases are undesired species that mainly have been absorbed in the glycol during drying. These light gases are vented at 24 as flash gas. Some of this flash gas may be vented at 23 as undesired emissions. The gas, 24, may also be used as fuel 25 to fire a reboiler 29 for regenerator 28. The glycol and small amount of water exits flash tank 22 at 27, then passes through a heat exchanger 26 where it is preheated and is then provided to the glycol regenerator 28.

The glycol regenerator 28 is heated, as for example from the gas fired reboiler 29 the flue gases from which exit at 30. The moist glycol is dried by the heat, and exits at line 31. It then passes through heat exchanger 26, is pumped back up to pressure by pump 33 and after passing through heat exchanger 13 is recycled back to absorber 12. Emissions from the heating are vented from the glycol regenerator 28 as regenerator off gas at 32. These emissions consist largely of the water which has been driven off from the glycol by the heating, which water is in the form of steam. However, there are also contained in the emissions a number of organic species, including benzene, toluene, ethyl benzene and xylenes (hereinafter collectively referred to as "BTEX"), and other volatile organic compounds ("VOC's") all of which (in the absence of control) are undesirably emitted to atmosphere.

The primary controls used to the present in order to eliminate or minimize organic emissions of the foregoing type are simple air and/or water-cooled condensers that produce a vent gas, an organic liquid, and liquid water containing organic compounds at a proportion of approximately 1400 parts per million (ppmw). This is comprised of about 350 ppm BTEX and 1050 ppm aliphatic hydrocarbons. Thus while BTEX control efficiency of these systems is high, a contaminated water is produced. This type of prior art control system is illustrated in the schematic showing of FIG. 2. Here the steam and organic emissions from glycol regenerator 28 pass via line 34 through a condenser 36 to the accumulator 38, where the emissions are separated into a water stream 40, an organic liquid 42, and vent gas 44. However, because of the nature of the emissions, the water stream 40 is highly contaminated as indicated. It may be noted that in some instance condenser 36 may include internally the functions of accumulator 38. Various thermal and catalytic incineration techniques have also been considered in the past as control techniques to eliminate the undesired organic species thus existing, but are costly to implement and not particularly effective or efficient.

In accordance with the foregoing it may be regarded as an object of the present invention, to provide method and apparatus for extracting water from a natural gas stream by contacting the stream with a glycol to absorb the water, wherein during the process of regenerating the glycol the volatile organic compounds which have been absorbed by the glycol during contact with the gas stream, are so removed as to minimize or virtually eliminate production of contaminated water streams.

It is a further object of the invention, to provide method and apparatus of the foregoing character, wherein an organics stripped water stream results, which has very low organics contained in same, and which may be used for further purposes including if desired for cooling of a condenser utilized in the process of the invention.

A further object of the invention, is to provide method and apparatus of the foregoing character, wherein an off gas by-product from the condensing stage can be utilized as fuel for the glycol regenerator heater, thereby serving the dual function of providing heat while destroying organics contained in the off-gas.

A further object of the invention, is to provide method and apparatus of the foregoing character, wherein the recovered relatively lowly organics-contaminated stripped water stream, may be further treated to provide a polished water of extremely low organics content, and of highly usable quality, which can be used as a coolant in the condenser stage of the system.

A still further object of the present invention, is to provide method and apparatus of the foregoing character, wherein a portion of the energy in the flash gas generated during the process, is used to compress the vent gas from the condenser/accumulator, to thereby provide a gaseous fuel which can be more effectively used for reboiler heating and for flaring, thereby enabling a net decrease in discharge of undesired gases to atmosphere.

SUMMARY OF INVENTION

The present invention is particularly applicable to the heretofore used method for extracting water from a gas such as a produced natural gas stream, by contacting the stream with a glycol to absorb the water and then regenerating the glycol for further use in extraction, by heating the moist glycol in a glycol regenerator to vaporize the water contained in same as steam. In accordance with the present invention, emissions of volatile organic compounds which have been absorbed by the glycol during contact with the natural gas stream are controlled, while minimizing production of contaminants in the produced water stream. Pursuant to the invention, the vented steam and gaseous volatile organics (VOC's) from the glycol regenerator, are flowed as input to the bottom of a steam stripper column. The vapors exiting from the top of the steam stripper column are flowed to a cooling condenser to produce a condenser water stream having a relatively high content of the organic compounds. The condenser water stream is passed to the top of the steam stripper and then through the stripper in countercurrent relation to the gaseous VOC's and steam, in consequence of which the condenser water stream is stripped by the steam of substantial parts of its organics content, and emerges from the bottom of the stripper or column as a stripped water stream having relatively low content of the said organics. The stripped water stream may thereafter be passed to a water polishing stage whereat the organic content is further reduced to produce a polished water stream. Such further stage can take the form of an activated carbon adsorption system, an air stripper, or a polishing steam stripper. At least a portion of the polished water from these polishing systems can be utilized as coolant for the condenser where the latter includes a water-cooled stage or is generally of the water-cooled type. The vapors from the steam stripper are condensed into a condenser water stream, an organic vent gas, and an organic liquid. The vent gas may be used as a heating source for the glycol regenerator. In a further aspect of the invention, some of the energy content of the flash gas (see FIG. 1) may be used to compress the vent gas to render the latter more suitable for use as fuel at the regenerator and/or for flaring to atmosphere. Preferably the flash gas drives a jet compressor, whereby the combined flash and vent gases may be used for the aforementioned purposes.

BRIEF DESCRIPTION OF THE DRAWINGS

The invention is diagrammatically illustrated by way of example, in the drawings appended hereto, in which.

DESCRIPTION OF PREFERRED EMBODIMENT

Figure 3:
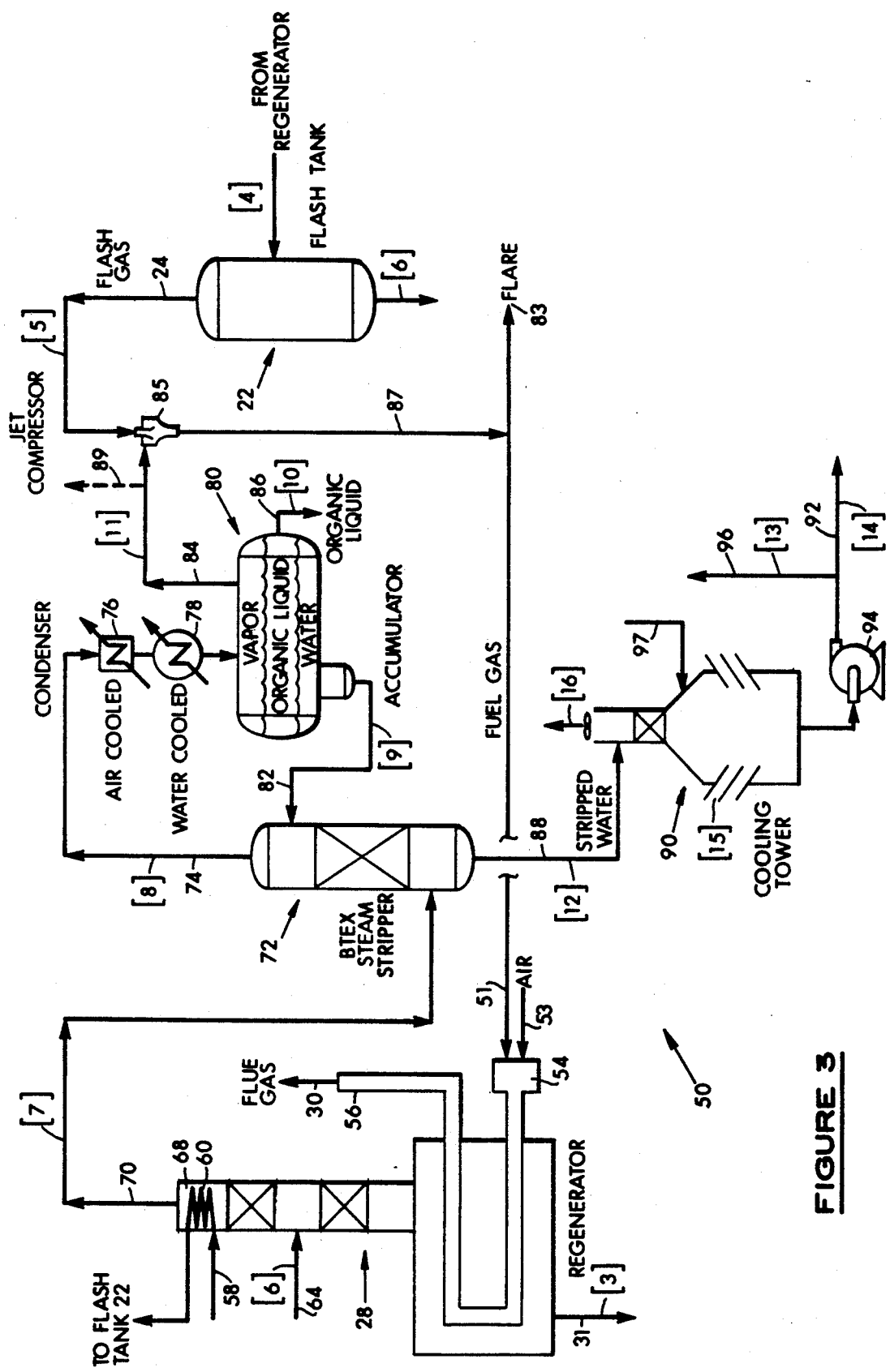
FIG. 3 is a schematic flow diagram illustrating a system in accordance with the present invention, for regenerating glycol used to dry natural gas, while at the same time producing a water stream which is significantly lower in its concentration of BTEX and other undesired organic species. Portions of the FIGS. 1 and 2 showings are incorporated by reference.

In FIG. 3 herein a schematic flow diagram appears illustrating a system 50 in accordance with the present invention. A generally conventional glycol regenerator 28 is provided, which is heated with fuel gas 51 and air 53 provided to the fuel input 54. Flue gas 30 from this heating section is discharged at output 56. The moist input glycol, which is preferably triethylene glycol, proceeds initially from absorber 12 (FIG. 1) via line 58. Some heat exchange to reflux a small amount of water is required in the glycol knock-back section 68. One means of providing this reflux is by heat exchange with the incoming moist glycol. The moist glycol can therefore be initially passed through a heat exchanger 60 at the top of the regenerator 28 and thence to flash tank 22 and heat exchanger 26 (FIG. 1) which preheats the glycol to a temperature of about 114° F. Other media, e.g. air, could be used to provide heat exchange in the glycol knock-back section 68. The preheated moist glycol then passes to the center part of the regenerator column via the input line 64 (see FIG. 1). After passing downwardly through the regenerator and being appropriately heated, the regenerated glycol is discharged at line 31 and recycled for use in drying the initial gas stream as described in FIG. 1. The gas stream being treated typically comprises a natural gas, but obviously the glycol can be used to dry other gas streams of interest as is known in the art.

Vapors from the middle section of the glycol regenerator 28, which consist mostly of steam, are sent to glycol knock-back section 68. Here the triethylene glycol contained in the steam is condensed and returned to the regenerator bottom. Gases are taken from the top of the glycol knock-back section via line 70 and sent to the bottom of a steam stripper 72, where the steam strips BTEX and other VOC's from the liquid water that is added to the top of steam stripper 72 via line 82. The vapors exiting from the top of steam stripper 72 via line 74 proceed to an air and/or water cooled condenser. Specifically in the embodiment shown, the vapors are first provided to an air-cooled condenser 76. Other media, e.g. moist glycol, could also provide heat exchange in condenser 76. After passing through condenser 76, they are provided to water-cooled condenser 78. From water-cooled condenser 78, the partially condensed vapors go to accumulator 80. Accumulator 80 provides three separate outputs, namely a condensed water stream at 82, vent gas at 84, and condensed organic liquids at 86. Accumulator 80 produces a water product 82, which in a typical operation of drying natural gas contains approximately 1400 ppm organic compounds along with marketable organic liquids 86 which consist mostly of BTEX, and an off-gas product 84 consisting mostly of lighter paraffins and BTEX. The condensed water 82 is then returned to steam stripper 72 where steam from the regenerator 28 strips out most of the VOC's and BTEX. The stripped product water 88 therefore exiting from the bottom of steam stripper 72, can typically contain about 100 ppm BTEX and 75 ppm aliphatic hydrocarbons.

In a further aspect of the present invention, the stripped water stream 88 can be subjected to additional treatment in a polishing stage to further lower its content of organics. In FIG. 3 such water 88 is seen to be provided to a polishing air stripper and cooling tower 90. Alternative devices which can be substituted for such instrumentality are a granulated activated carbon adsorption treatment system or a polishing steam stripper. The input stripped water 88 typically containing about 100 ppm BTEX and 75 ppm aliphatic or 28% of the BTEX and 7% of the aliphatic hydrocarbons originally present in the water can be thereby further improved, with the remaining BTEX being removed, thereby producing water of usable quality with extremely low concentrations of BTEX and VOC's. The final polished water 92 is provided via the pump 94.

Most of the BTEX and condensible VOC's in the stripper overhead will exit accumulator 80 either in the gas phase 84 or as a condensed organic BTEX liquid at 86. The split between vapor and liquid is a function of the temperature. For example, at 160° F. about 42% of the $C_{3+}$ leaves with gas 84; at 90° F. only 21% of the $C_{3+}$ exits with gas 84. In order to enable maximum recovery of the condensible organics as liquid, the temperature achieved in water cooled condenser 78 should be as low as possible. The relatively pure water from cooling tower 90 may be used as input cooling water 96 for the water cooled condenser 78, i.e. this water is provided as coolant to condenser 78, the return stream from which is shown at 97. This enables condenser 78 to reach a temperature of 90° F. or lower in the summer which further improves BTEX and VOC recovery efficiency. BTEX and VOC removal from the condensed water is essentially unaffected by condenser temperature.

In a further aspect of the present invention the flue gas 56 from the glycol regenerator heater may be utilized as a source of heat where the polishing stripper 90 takes the form of a steam stripper as above discussed. In such an instance, steam from the polishing steam stripper may be sent to the BTEX steam stripper condensers 76, 78 where the BTEX can be recovered. As shown in FIG. 3, air stripping may be combined with a cooling tower to provide the cooling water 96 for condenser 78.

While it is possible to release vent gas 84 to atmosphere (as at 89), in a yet further aspect of the invention the vent gas 84 from accumulator 80 can be used as a fuel gas for the glycol regenerator heater, i.e. this fuel gas can be provided to input 54. In this manner, a dual function is satisfied, i.e. heat for the regenerator is usefully recovered, while at the same time the organics contained in the vent gas 84 are destroyed. It is also desirable to be able to flare the said vent gas to atmosphere. For the purposes indicated, it is desirable to raise the pressure of the vent gas above atmosphere, preferably to about 3 to 10 psig.

This pressurization may be effected by means of a jet compressor 85. The flash gas 24 from flash tank 22, which was discussed in connection with FIG. 1 constitutes principally light hydrocarbons is used as the motive gas for compressor 85. The mixed flammable gases in line 87, at about 3 to 5 psig may then safely and effectively serve as the fuel gas 51 which is combined with air 53 to provide a heat source for regenerator 28. Similarly the slightly compressed gases may be safely and effectively flared at 83.

Figure 1:
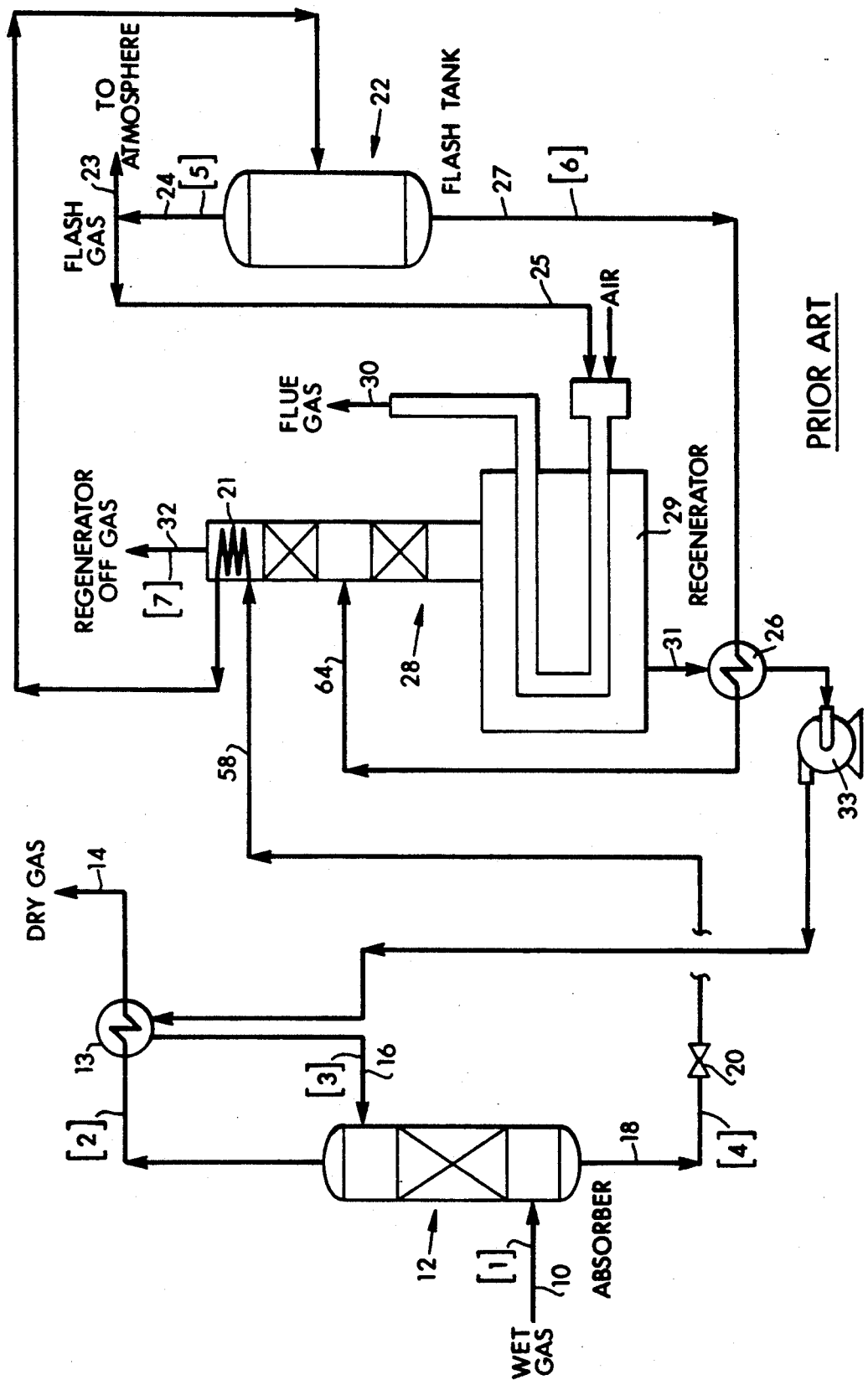
FIG. 1 is a prior art schematic illustration of an uncontrolled system used in the course of regenerating a glycol used for drying a gas stream.
Figure 2:
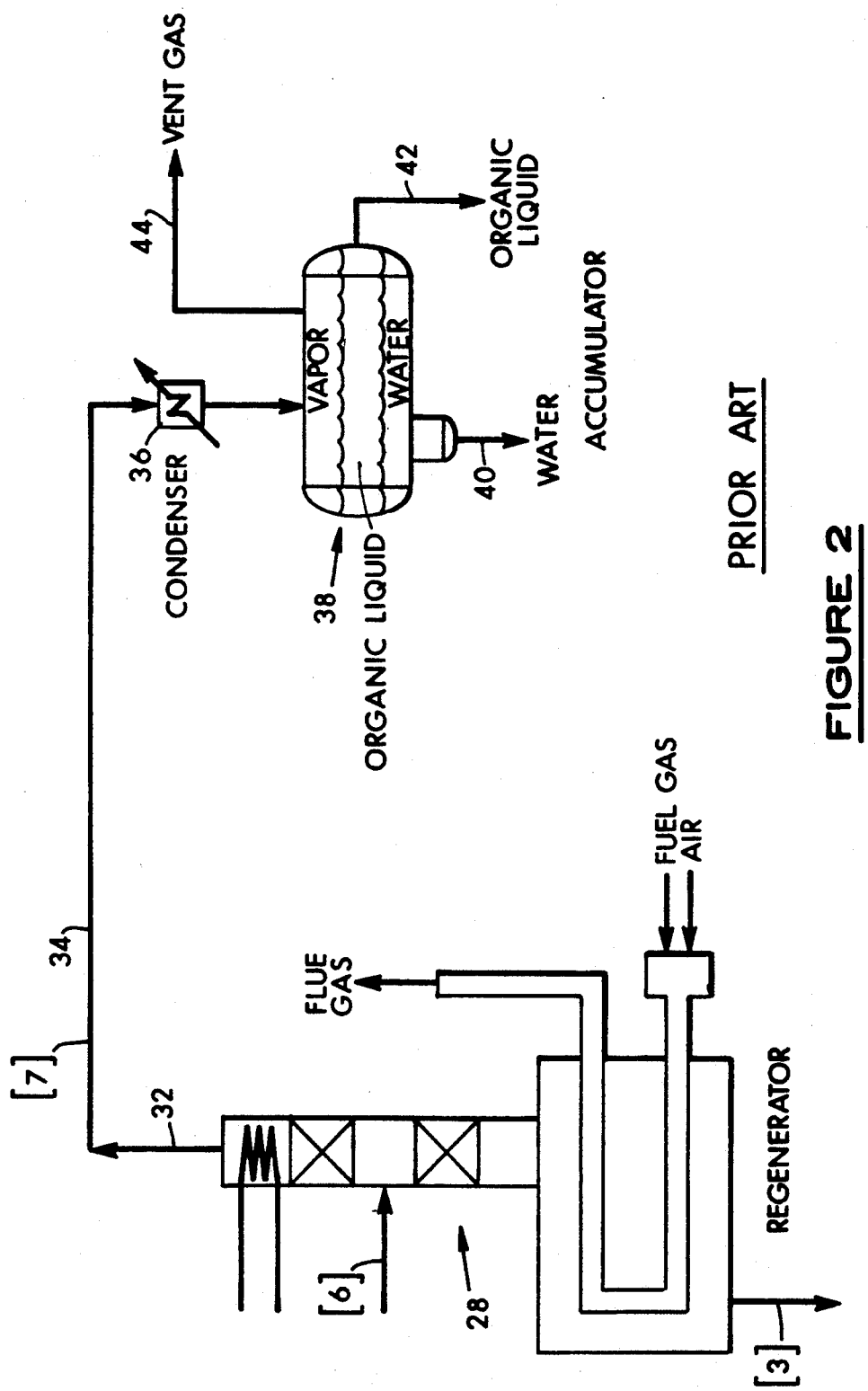
FIG. 2 is a further prior art showing, depicting a conventional condensation control system which can be used with the FIG. 1 apparatus.

Use of the jet compressor 85 for the purposes of compressing the vent gas 84 from accumulator 80 is also applicable to the otherwise prior art system of FIG. 2 (i.e. the system of FIG. 1 which includes the condenser and accumulator of FIG. 2). Again in this context the flash gas 24 may be used (as in FIG. 3) to compress the said vent gas for the same advantages as described in connection with FIG. 3.

The effectiveness of the present invention is further illustrated in the data of Table I which sets forth component material balance for a system 50 in accordance with FIG. 3 which is used to treat a 35 MMSCFD gas which includes the components indicated. The numerals at the head of each column correspond to the same bracketed numerals appearing in FIGS. 1, 2 and 3 in which they identify the sampled points in system 50. The concentrations of organics in the water streams are given in Table II. The effectiveness of the system in reducing BTEX and aliphatic compounds in the stripped water will be particularly evident by comparing the reflux water to packed column bottoms [12] and the blowdown cool water [14].

TABLE I

| Basis: 35 MM SCFD Wet Gas 55 gph Lean Glycol Comp. # mols/hr | MW | 1 Wet Gas | 2 Dry Gas | 3 Lean TEG | 4 Rich TEG | 5 Flash Gas | 6 Flash Liq | 7 Regen Offgas | 8 Column Overhead | 9 Reflux Water | 10 Organic Product |
|---|---|---|---|---|---|---|---|---|---|---|---|
| Water | 18.0 | 2.2783 | 0.2035 | 0.282 | 2.3567 | 0.0047 | 2.3520 | 2.0705 | 1.8193 | 1.8116 | 0.0004 |
| TEG | 150.2 | 0.0000 | 0.0005 | 3.328 | 3.3279 | 6.99E − 07 | 3.32790 | 0.0 | 0.0 | 0.0 | 0.0 |
| Methane | 16.0 | 3502.790 | 3502.723 | 0.0 | 0.6327 | 0.6289 | 0.0038 | 0.0038 | 0.0038 | 9.33E − 07 | 1.58E − 07 |
| Ethane | 30.0 | 224.690 | 224.471 | 0.0 | 0.2550 | 0.1738 | 0.0813 | 0.0813 | 0.0817 | 4.47E − 04 | 0.0054 |
| Propane | 44.0 | 56.650 | 56.571 | 0.0 | 0.0876 | 0.0536 | 0.034 | 0.034 | 0.0342 | 1.34E − 04 | 0.0053 |
| n-Butane | 58.0 | 14.188 | 14.155 | 0.0 | 0.0343 | 0.0158 | 0.0185 | 0.0185 | 0.0186 | 5.22E − 05 | 0.0067 |
| Isobutane | 58.0 | 19.508 | 19.475 | 0.0 | 0.0356 | 0.0190 | 0.0166 | 0.0166 | 0.0166 | 3.73E − 05 | 0.0048 |
| n-Pentane | 72.0 | 5.012 | 4.993 | 0.0 | 0.0198 | 0.0061 | 0.0137 | 0.0137 | 0.0138 | 2.11E − 05 | 0.0089 |
| Isopentane | 72.0 | 9.715 | 9.687 | 0.0 | 0.0303 | 0.0110 | 0.0194 | 0.0194 | 0.0194 | 2.66E − 05 | 0.0112 |
| Hexane + | 84.0 | 22.746 | 22.600 | 0.0 | 0.1498 | 0.0279 | 0.1219 | 0.1219 | 0.1220 | 7.56E − 05 | 0.041 |
| Benzene | 78.0 | 0.965 | 0.926 | 1.66E − 05 | 0.0395 | 0.0017 | 0.0377 | 0.0377 | 0.0378 | 1.02E − 04 | 0.0341 |
| Toluene | 92.0 | 0.579 | 0.540 | 9.92E − 06 | 0.0397 | 0.0009 | 0.0388 | 0.0388 | 0.0388 | 2.52E − 05 | 0.0375 |
| Ethylbenzene | 106.0 | 0.193 | 0.165 | 7.57E − 06 | 0.0278 | 0.0003 | 0.0276 | 0.0276 | 0.0276 | 6.17E − 06 | 0.0273 |
| Xylene | 106.0 | 0.386 | 0.345 | 5.62E − 06 | 0.0414 | 0.0005 | 0.0409 | 0.0409 | 0.0409 | 5.46E − 06 | 0.0404 |
| N2 | 28.0 | NA | NA | NA | NA | NA | NA | NA | NA | NA | NA |
| TOTAL | | 3,860 | 3,857 | 3.61 | 7.08 | 0.94 | 6.13 | 2.52 | 2.27 | 1.81 | 0.22 |
| Temp, deg F. | | 78.0 | 79.1 | 130.0 | 78.5 | 114.0 | 114.0 | 204.6 | 201.9 | 85.0 | 85.0 |
| Press, psia | | 1029.7 | 1029.7 | 1029.7 | 1029.7 | 70.0 | 70.0 | 15.3 | 15.0 | 14.7 | 14.7 |
| Avg MW | | 18.3 | 18.3 | 139.9 | 84.6 | 25.1 | 93.7 | 27.7 | 28.8 | 18.0 | 86.7 |
| # mol/ft3 | | 0.212 | 0.212 | 0.491 | 0.598 | 0.012 | 0.708 | 0.002 | 0.002 | 3.421 | 0.533 |
| #/ft3 | | 3.89 | 3.89 | 68.70 | 50.59 | 0.29 | 66.38 | 0.058 | 0.061 | 61.69 | 46.19 |
| #/hr | | 70,662 | 70,577 | 504.9 | 598.7 | 23.7 | 574.8 | 70.1 | 65.6 | 32.7 | 19.3 |
| gpm (liquid) | | — | — | 0.92 | 1.11 | — | 1.08 | — | — | 0.07 | 0.05 |

TABLE I-continued

| | | | | | | 12 | 13 | | | 16 |
|---|---|---|---|---|---|---|---|---|---|---|
| acfm (vapor) | | 302.9 | 302.6 | — | 0.05 | 1.4 | — | 20.0 | 18.1 | — | — |

| | Basis: 35 MM SCFD Wet Gas 55 gph Lean Glycol Comp. # mols/hr | MW | 11 Condenser Vent Gas | 12 Packed Column Bottoms | 13 (a) Recirc Cool Water | 14 Blowdown Cool Water | 15 Stripping Air | 16 (b) CTower Vent Gas |
|---|---|---|---|---|---|---|---|---|
| Water | | 18.0 | 0.0073 | 2.0628 | 29.21 | 0.3392 | 1.323 | 3.0242 |
| TEG | | 150.2 | 0.0 | 0.0 | 0.0 | 0.0 | 0.0 | 0.0 |
| Methane | | 16.0 | 0.0038 | 4.72E − 08 | 0.0 | 0.0 | 0.0 | 4.72E − 08 |
| Ethane | | 30.0 | 0.0758 | 3.48E − 05 | 0.0 | 0.0 | 0.0 | 3.48E − 08 |
| Propane | | 44.0 | 0.0287 | 7.65E − 06 | 0.0 | 0.0 | 0.0 | 7.65E − 06 |
| n-Butane | | 58.0 | 0.0118 | 2.78E − 06 | 0.0 | 0.0 | 0.0 | 2.78E − 06 |
| Isobutane | | 58.0 | 0.0117 | 2.04E − 06 | 0.0 | 0.0 | 0.0 | 2.04E − 06 |
| n-Pentane | | 72.0 | 0.0048 | 1.55E − 06 | 0.0 | 0.0 | 0.0 | 1.55E − 06 |
| Isopentane | | 72.0 | 0.0081 | 1.82E − 06 | 0.0 | 0.0 | 0.0 | 1.82E − 06 |
| Hexane + | | 84.0 | 0.0178 | 1.06E − 05 | 0.0 | 0.0 | 0.0 | 1.06E − 05 |
| Benzene | | 78.0 | 0.0035 | 1.66E − 05 | 0.0 | 0.0 | 0.0 | 1.66E − 05 |
| Toluene | | 92.0 | 0.0020 | 9.92E − 06 | 0.0 | 0.0 | 0.0 | 9.92E − 06 |
| Ethylbenzene | | 106.0 | 2.23E − 04 | 7.58E − 06 | 0.0 | 0.0 | 0.0 | 7.58E − 06 |
| Xylene | | 106.0 | 4.58E − 04 | 5.62E − 06 | 0.0 | 0.0 | 0.0 | 5.62E − 06 |
| N2 | | 28.0 | NA | NA | NA | NA | 58.677 | 58.677 |
| TOTAL | | | 0.18 | 2.06 | 29.21 | 0.34 | 60.00 | 61.70 |
| Temp, deg F. | | | 85.0 | 203.9 | 75.9 | 75.9 | 95.0 | 93.2 |
| Press, psia | | | 14.7 | 15.33 | 14.7 | 14.7 | 14.7 | 14.7 |
| Avg MW | | | 45.9 | 18.0 | 18.0 | 18.0 | 27.8 | 27.5 |
| # mol/ft3 | | | 0.003 | 3.194 | 3.426 | 3.426 | 0.002 | 0.002 |
| #/ft3 | | | 0.11 | 57.55 | 61.72 | 61.72 | 0.07 | 0.07 |
| #/hr | | | 8.1 | 37.2 | 526.2 | 6.1 | 1667.6 | 1696.8 |
| gpm (liquid) | | | — | 0.08 | 1.06 | 0.01 | — | — |
| acfm (vapor) | | | 1.2 | — | — | — | 416.7 | 428.5 |

(a) Return Cooling Water Temp: 120.0 deg F.
(b) BTEX Emissions: 0.09 lbs/day

TABLE II

Basis: 35 MM SCFD Wet Gas, 55 gph Lean Glycol

| Comp, ppmw | MW | 9 Reflux Water | 12 Packed Column Bottoms | 13 Recirc Cool Water | 14 Blowdown Cool Water |
|---|---|---|---|---|---|
| Methane | 16.0 | 0 | 0 | <0.01 | <0.01 |
| Ethane | 30.0 | 411 | 28 | <0.01 | <0.01 |
| Propane | 44.0 | 180 | 9 | <0.01 | <0.01 |
| n-Butane | 58.0 | 93 | 4 | <0.01 | <0.01 |
| Isobutane | 58.0 | 66 | 3 | <0.01 | <0.01 |
| n-Pentane | 72.0 | 46 | 3 | <0.01 | <0.01 |
| Isopentane | 72.0 | 59 | 4 | <0.01 | <0.01 |
| Hexane + | 84.0 | 194 | 24 | <0.01 | <0.01 |
| Total Aliphatics | | 1,049 | 75 | <0.01 | <0.01 |
| Benzene | 78.0 | 244 | 35 | <0.01 | <0.01 |
| Toluene | 92.0 | 71 | 25 | <0.01 | <0.01 |
| Ethylbenzene | 106.0 | 20 | 22 | <0.01 | <0.01 |
| Xylenes | 106.0 | 18 | 16 | <0.01 | <0.01 |
| Total Aromatics | | 352 | 97 | <0.01 | <0.01 |
| Total Organics | | 1,401 | 172 | <0.01 | <0.01 |

While the present invention has been particularly described in terms of specific embodiments thereof, it will be understood in view of the present disclosure that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. In the method for extracting water from a gas stream containing quantities of water and of volatile organic compounds by contacting said gas stream with a glycol to absorb the water, and then regenerating the glycol for further use in said extracting by heating the moist glycol in a glycol regenerator to vaporize the water contained in same as steam and venting the steam and gasified volatile organics which have been absorbed by the glycol during contact with the gas stream; the improvement enabling control of emissions of said volatile organic compounds which have been absorbed by the glycol during contact with said gas stream, while minimizing contaminants in the produced water streams; comprising:

flowing the vented steam and gasified volatile organics from the glycol regenerator as input to the bottom of a steam stripper column;

flowing the vapors from the top of the steam stripper column to a colling condenser to produce a condenser water stream having a relatively high content of said organic compounds; and passing said condenser water stream to the top of said steam stripper and then through said stripper in countercurrent relation to said vented steam and gasified volatile organics, whereby said condenser water steam is stripped of substantial parts of its organics content and emerges from the bottom of said stripper column as a stripper water stream having relatively low content of said organics.

2. A method in accordance with claim 1, further including passing said stripped water stream through a water polishing means to remove additional quantities of said organics.

3. A method in accordance with claim 2, wherein said stripped water stream is polished by passing same through an activated carbon adsorption system.

4. A method in accordance with claim 2, wherein said stripped water is polished by passing same through a polishing air stripper.

5. A method in accordance with claim 2, wherein said stripped water stream is polished by passing same through a polishing steam stripper.

6. A method in accordance with claim 2, wherein said condenser is at least partially water-cooled, and at least a portion of the polished water from said further polishing treatment is used to cool said condenser.

7. A method in accordance with claim 1, wherein said vapors from said steam stripper are condensed at said condenser into said condenser water stream, and as an organic vent gas and an organic liquid; and wherein said vent gas is recirculated and used as a heating source for said glycol regenerator.

8. A method in accordance with claim 7, wherein the moist glycol from contact with the said gas stream is passed through a flash tank before being passed to said regenerator for moisture extraction, said flash tank effecting separation of light hydrocarbons as flash gas; and wherein said flash gas is used at a jet compressor as a motive gas to compress said vent gas and being combined therewith, said combined and compressed flash and vent gases being provided as a said heating source to said glycol regenerator.

9. A method in accordance with claim 8, wherein at least part of said combined flash and vent gases are further flared to atmosphere.

10. A method in accordance with claim 1, wherein said gas stream is a produced natural gas.

11. A method in accordance with claim 1, wherein said gas stream includes one or more organic species selected from the group consisting of benzene, toluene, ethylbenzene, and xylenes.

12. In a system for extracting water from a gas stream containing quantities of water and of volatile organic compounds, which system includes a glycol regenerator including a heating section for heating moist glycol provided thereto to thereby separate and vent the moister from same as steam; means to provide the moist glycol having contacted the gas stream to said glycol regenerator for heating, and means for discharging the dried glycol from said regenerator and recycle same for further drying of said gas stream; the improvement enabling control of emissions of volatile organic compounds which have been absorbed by the glycol during contact with said gas stream and which are vented with said stream, while minimizing the organic contaminants in the water streams produced; comprising:
 a steam stripper column;
 means for flowing the vented steam and gaseous volatile organics from said glycol regenerator as an input to the bottom of said stripper column;
 a cooling condenser;
 means for flowing the vapors exiting from the top of said steam stripper column to said cooling condenser to produce a condenser water stream having a relatively high content of said organic compounds; and
 means for passing said condenser water stream as an input to the top of said steam stripper, and thence through said stripper in countercurrent relation to said vented steam and gaseous volatile organics, whereby said condenser water stream is stripped of substantial parts of its organics content and emerges from the bottom of said stripper column as a stripped water stream having relatively low content of said organics.

13. A system in accordance with claim 12, further including water polishing means for receiving said stripped water stream and further reducing the content of the said organics present in same.

14. A system in accordance with claim 13, wherein said water polishing means comprises an air stripper.

15. A system in accordance with claim 13, wherein said water polishing means comprises a steam stripper.

16. A system in accordance with claim 13, wherein said condenser is at least partially water-cooled, and wherein at least a portion of the polished water from said polishing means is provided to said condenser to serve as a coolant in same.

17. A system in accordance with claim 16, further including an accumulator for receiving the output of said condenser and splitting the condensation of said vapors from said stream stripper into water, organic liquid, and vent fuel gas streams; and said system further includes means for recirculating said vent fuel gas for use in heating said glycol regenerator.

18. A system in accordance with claim 17, further including a flash tank connected to receive the moist glycol from contact with said gas stream before passing same to said regenerator for moisture extraction, and effect separation of light hydrocarbons as flash gas; and a jet compressor for receiving and compressing said vent fuel gas; said flash gas being provided to said jet compressor as a motive gas; the compressed vent gas and flash gas being combined downstream of said jet compressor and provided to said regenerator for said heating.

19. A system in accordance with claim 18, further including means for flaring to atmosphere at least a portion of said flash and vent gases which are combined downstream of said jet compressor.

20. A system in accordance with claim 12, wherein said gas stream is a produced natural gas.

21. A system in accordance with claim 12, wherein said gas stream includes one or more organic species selected from the group consisting of benzene, toluene, ethylbenzene, and xylene.

22. A system for extracting water from a produced gas stream containing quantities of water and of volatile organic compounds, comprising in combination:
 a glycol regenerator including a heating section for heating moist and volatile organic compound-containing glycol provided thereto to thereby separate and vent the moisture from same as steam and the volatile organic compounds as gases;
 means to provide the moist and volatile organic compound-containing glycol having contacted the gas stream to said glycol regenerator for heating;
 means for discharging the dried glycol from said regenerator and recyle same for further drying of said gas stream;
 a cooling condenser and an accumulator;
 means for flowing the vented steam and gaseous volatile organics from the glycol regenerator as an input to said cooling condenser and accumulator, said condenser and accumulator splitting the condensation of said vapors from said regenerator into water, organic liquid, and vent fuel gas streams;
 said system further including means for recirculating said vent fuel gas for use in heating said clycol regenerator;
 a flash tank connected to receive the moist glycol from contact with said gas stream before passing same to said regenerator for moisture extraction, and effect separation of light hydrocarbons as flash gas; and
 a jet compressor for receiving and compressing said vent fuel gas; said flash gas being provided to said jet compressor as a motive gas; the compressed vent gas and flash gas being combined downstream of said jet compressor and provided to said regenerator for said heating.

23. A system in accordance with claim 22, further including means for flaring to atmosphere at least a portion of said flash and vent gases which are combined downstream of said jet compressor.

24. A system in accordance with claim 22, wherein said gas stream is a produced natural gas.

25. A system in accordance with claim 22, wherein said stream includes one or more organic species selected from the group consisting of benzene, toluene, ethylbenzene, and xylenses.

* * * * *